Jan. 26, 1971 F. R. CARLOCK ET AL 3,559,181

CRT PARAMETER ERROR INDICATOR PANEL

Filed Dec. 14, 1967 2 Sheets-Sheet 1

INVENTORS
FRANK R. CARLOCK
WILLAM R. LAMOREUX
BY Joseph J Connerton
ATTORNEY

Patented Jan. 26, 1971

United States Patent Office 3,559,181

3,559,181

CRT PARAMETER ERROR INDICATOR PANEL

Frank R. Carlock, Hyde Park, and William R. Lamoureux, Kingston, N.Y., assignors to International Business Machines Corporation, Armonk, N.Y., a corporation of New York Filed Dec. 14, 1967, Ser. No. 690,588
Int. Cl. G06f *11/00, 3/14*
U.S. Cl. 340—172.5 3 Claims

ABSTRACT OF THE DISCLOSURE

An operator's console for a data processing system includes a cathode ray tube indicator panel for diagnostic testing and servicing. Various parameters being monitored or their encoded representations are displayed on the CRT indicator and represented by a plurality of indicators. Information transferred into the operator's console is error checked on a byte basis, and upon detection of an error, the indicator representing the byte in which the error occurs is caused to blink, thus identifying the source of the error immediately to the operator.

BACKGROUND OF THE INVENTION

Figure 1:
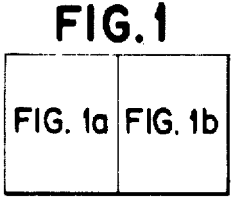

In the data processing art, as system configurations grow in size and complexity, the attendant problems of servicing and maintenance grow apace. Conventionally, data processing systems include an associated maintenance console to monitor the more significant or critical parameters and to assist in detecting, identifying and localizing the source of errors. Such maintenance consoles generally include indicators in the form of lamps to visually identify the condition of those parameters being monitored. In large scale data processing systems using multidigit words such as 72 or 96 bit words, for example, certain machine elements being monitored such as registers have associated sets of indicators, each set having 144 or 192 indicators to identify the bistable state of each bit in the word. If an error such as a parity error is detected within this word and is so identified by conventional error detection routines, depending on the significance of such error in the program or routine, the system might be halted until the condition is corrected. When halted, the condition of the various parameters being monitored at the time the error was detected will be shown by the indicators. Upon error detection, the maintenance operator would normally compare the individual indicators with a servicing chart to determine the precise location of the error. Thus, a substantial amount of time may be expended to initially determine the source of the error before corrective action can be taken.

SUMMARY OF THE INVENTION

The present invention identifies errors by checking each word as a sequence of bytes, and upon identification of the byte producing the error condition, causing the associated indicators or their hexadecimal equivalents to blink, thus providing a visual manifestation of the error and bringing it immediately to the operator's attention for corrective action.

Accordingly, a primary object of the present invention is to provide an improved maintenance console.

Another object of the present invention is to provide an improved maintenance console for data processing systems utilizing a CRT type display.

Another object of the present invention is to provide an improved maintenance console for a data processing system wherein errors relating to monitored parameters are readily identifiable by blinking or pulsating indicators.

Still another object of the present invention is to provide a system for monitoring parameters of a data processing system and upon error detection providing a visual indication of the source of the error.

The foregoing and other objects, features and advantages of the invention will be apparent from the following more particular description of a preferred embodiment of the invention, as illustrated in the accompanying drawings.

Figure 1A:
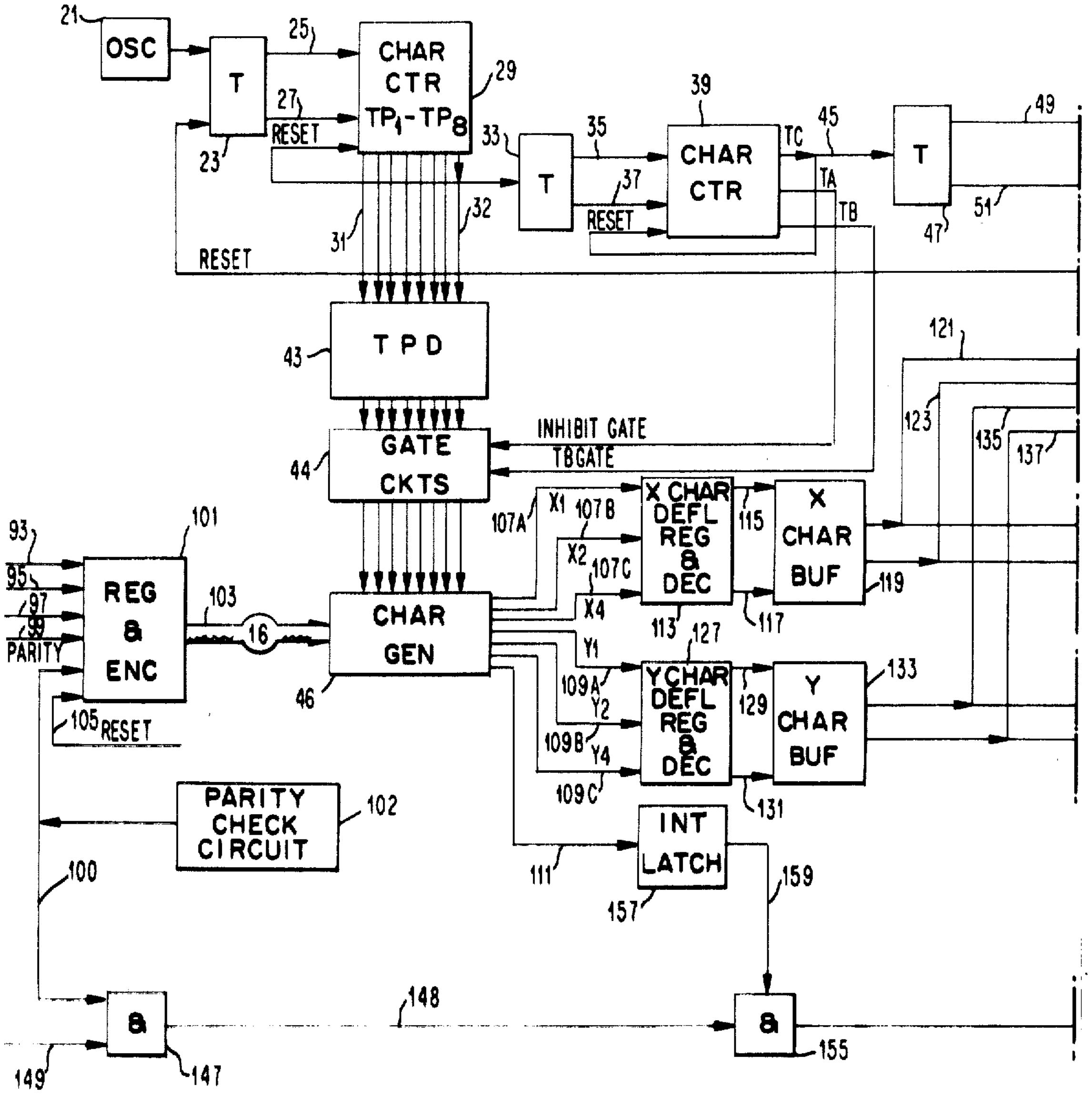
Figure 1B:
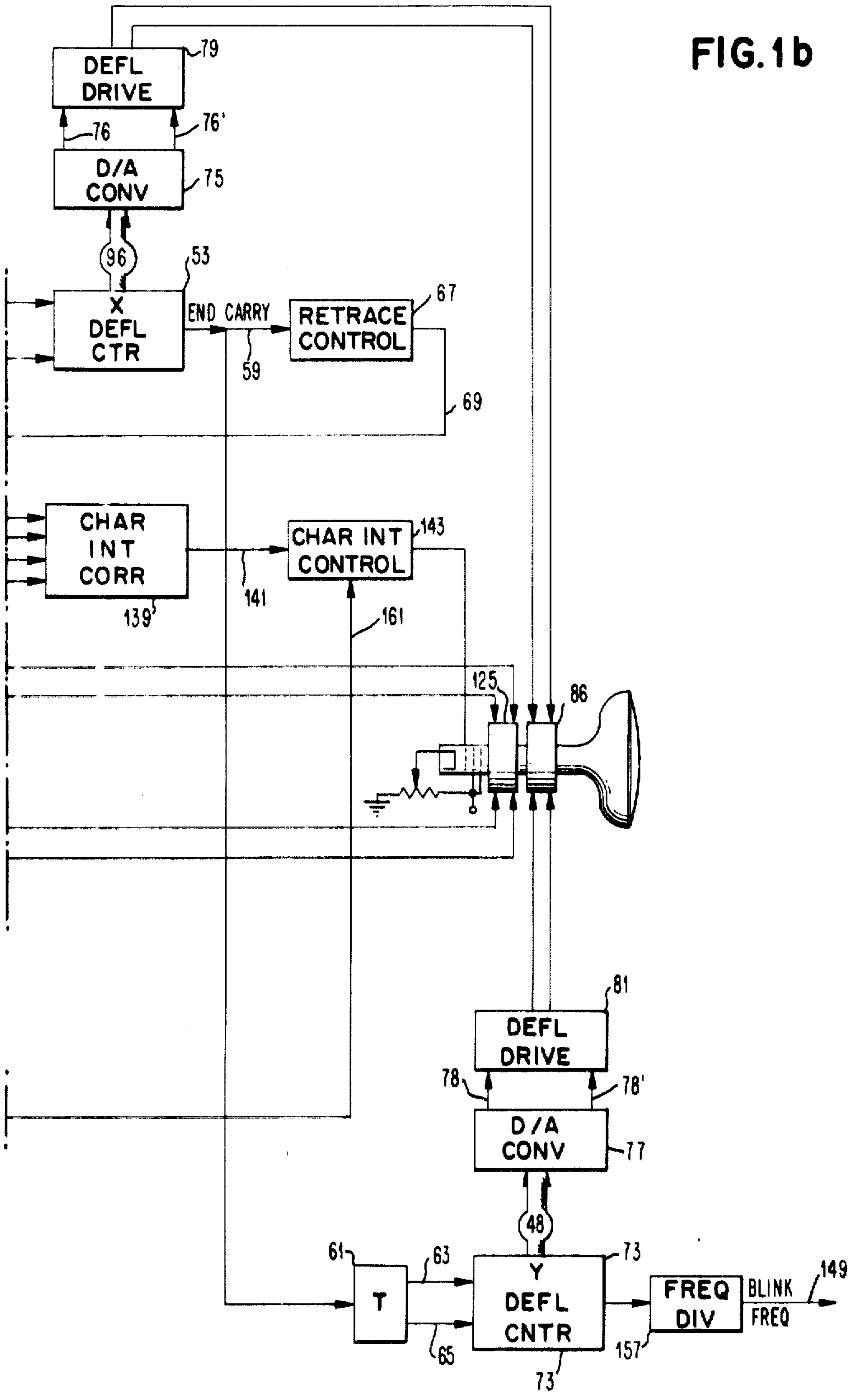

In the drawings:

FIGS. 1A and 1B indicate in block logical form a preferred embodiment of the present invention.

DESCRIPTION OF THE PREFERRED EMBODIMENT

Referring now to the drawings and more particularly to FIG. 1 thereof, there is illustrated in block logical form a preferred embodiment of the subject invention. The disclosed embodiment of the subject invention operates as follows. A two megacycle oscillator 21 applies pulses to a binary trigger 23, which functions as a pulse divider to generate A and B timing pulses at a one megacycle rate on lines 25 and 27 respectively. These timing pulses are applied to a character counter 29, which generates eight timing pulses TP1 through TP8 on lines 31. Counters employed in the preferred embodiment of the invention are known as ODD-EVEN counters in which the individual counter stages in the form of triggers or latches are divided into ODD and EVEN groups, each group being sampled alternately by A and B timing pulses. This arrangement reduces the problem of pulse slivering, but any type conventional counter could be employed. The TP8 timing pulse output on line 32 is also applied to binary trigger 33, and a reset pulse to the character counter 29. Trigger 33 functions as a frequency divider to generate A and B timing pulses on lines 35 and 37 at an eight microsecond rate. These timing pulses are applied to a three stage character counter 39 which generates three output pulses designated TA through TC. The TA pulse inhibits character generation during TA time by inhibiting the output from gate circuits 44. The TB pulse labeled TB gate permits character generation during TB time by conditioning gate circuits 44 connecting the time pulse distributor 43 to character generator 46. The TC pulse (on line 45 )is applied to trigger 47, which in turn generates A and B timing pulses on lines 49 and 51 at 24 microsecond intervals and in addition provides the reset signal to character counter 39.

The timing and counting configuration employed in the present invention is designed to accept input signals at a rate provided by the associated processor or storage, to control the high speed digital circuitry and alternately control the lower speed analog circuitry associated with CRT display systems. Since the outputs of trigger 47 are connected to the horizontal deflection counter 53, the TC counting pulses on line 45 effectively step the deflection through the X deflection counter 53 one increment in the X direction for each character generated to reposition it for the net character generation. In the environmental system herein shown and described as illustrative of the present invention, a display capability of 24 rows or lines is provided, each said row having a maximum capacity of 48 characters. Hexadecimal character representations of each byte may be displayed, or alternatively, indicators for each separate bit may be utilized. A dual deflection system having a main yoke for character positioning and an auxiliary yoke for character generation is employed. The horizontal character position is controlled by X deflection counter 53. Operating in push-pull mode, the X deflection counter of the preferred embodiment utilizes 96 output lines to identify the 48 possible character positions. At the end of the deflection period for each line, i.e., the last character position, the end carry output 59 from the deflection counter 53 is applied to binary trigger 61 to reposition the Y deflection for the next row of characters through A and B pulses on lines 63 and 65 and Y deflection counter 73. Y deflection counter 73 provides 48 outputs required to define the 24 rows in push-pull mode. The end carry signal on line 59 is also applied through retrace control circuit 67 and its associated output 69 to reset the binary trigger 23 and thus initiate conditions for the next row of characters during retrace time. The outputs from the X and Y deflection counters 53 and 73 are applied through their respective D/A converters 75 and 77 and the resultant analog deflection signals applied through lines 76, 76', 78, 78' to their respective deflection drive circuits 79 and 81 to the X and Y yoke windings of the main yoke 86. The deflection drive circuits may comprise a pair of transistors for each deflection components, the common output 76, 76', 78, 78' from the decoders 75, 77 connected to the emitters, the collectors being connected to the associated windings of deflection coil 86.

Returning now to the character generator, only the 16 symbols used in the hexadecimal code are employed in the indicator assembly of the preferred embodiment, since this represents a convenient single character display for each byte of information. The character generator 46 used in the preferred embodiment of the present invention, as more fully described hereinafter, is a stroke generator which requires a maximum of eight strokes to define each character. While various stroke generators are known in the display art for the generation of characters, a preferred character generator is shown in U.S. Patent No. 3,334,304, "Asynchronous Character Generation for Successive Endpoint Definition," issued to R. J. Fournier et al. on Aug. 1, 1967. Character Generator 46 generates one of the hezxadecimal symbols, i.e., 0 through 9 and A through F. Using hexadecimal code or individual symbols, each indicator display has an associated register which is continuously sampled to regenerate the display. Four bit bytes of data comprising signals 93, 95, 97 and 99 are transferred from the computer or an indicator register, not shown, to Register and Encoding circuit 101, which encodes the input to hexadecimal code and selects one of the sixteen outputs on lines 103, thereby selecting the hexadecimal character for display by character generator 46. Each byte of data is aparity checked by parity check circuit 102 before transmission and an associated signal indicative of parity on line 100 is applied to logical AND circuit 147. A reset line 105 is used to clear the register-encoder 101 between byte inputs. The character generator utilized in the preferred embodiment generates a maximum of eight strokes per character and the outputs for ease of illustration are shown as single ended, although in a push-pull system bipolar outputs for each deflection signal would be employed. The deflection for each stroke is defined in digital form by three horizontal deflection lines X1, X2, X4 and three vertical deflection lines Y1, Y2, Y4 on lines 107A, 107B, 107C and 109A, 109B and 109C, respectively, and a single intensity line 111. Obviously, if a larger matrix or different font having more addressable points was desired, the resultant output from character generator 46 would require a greater number of bits. The first, second and third outputs of character generator 46 on lines 107A, 107B and 107C are indicative of the first, second and third binary digits respectively of the X coordinate, i.e., X1, X2 and X4. The fourth, fifth and sixth outputs on lines 109A, 109B and 109C are indicative of the first, second and third binary digit of the Y coordinate, i.e., Y1, Y2 and Y4. The X deflection signals on lines 107A, 107B and 107C are applied to the horizontal character deflection register and decoder 113, decoded to an analog equivalent and applied via lines 115 and 117 through the X character buffer 119 and lines 121 and 123 to the horizontal winding of character yoke 125. Likewise, the Y character deflection signals on lines 109A, 109B and 109C are applied to a vertical character deflection register and decoder 127, converted to analog form on lines 129, 131 and applied from Y character buffer through lines 135 and 137 to the Y windings of the character yoke 125. Additionally, since the character generator employed in the preferred embodiment is a constant time system, the intensity varies inversely with the length or time of the vector being generated. Accordingly, the horizontal and vertical deflection outputs from the character buffers 119, 133 are applied through an intensity correction circuit 139, the output of which is applied through an intensity control circuit 143, which provides a substantially uniform intensity of the CRT beam. Intensity control circuit 143 basically is conditioned by the output from analog AND circuit 155, which in turn is conditioned by a digital signal on line 148 to pass the analog intensity correction signal on line 159 to line 161.

The above described sequence indicates how the character representing each byte of data is decoded and displayed on the CRT screen. The manner in which those displayed parameters defining an error condition are caused to blink to provide a visual indication of the error occurs in the following manner. While various sophisticated error detection techniques are known in the data processing art, one of the most commonly employed is parity checking, i.e., an extra bit known as a parity bit is associated with each word to indicate whether the contents of the word has an EVEN or ODD number of significant bits. Using ODD parity, for example, the total number of binary one's in the word, including the parity bit, is ODD. Parity checking may be performed during various machine operations, including, in the present invention, transfer between the machine elements being monitored and the indicator display panel. Such transfers take place on a byte basis, and as indicated above, parity is likewise checked on a byte basis. Parity detection circuits and systems are well known in the digital computer art, and the details thereof are omitted from the present invention in the interest of clarity. However, one example of parity error generation and correction apparatus is shown in U.S. Patent No. 2,884,625, "Code Generator," issued to B. W. Kippenhan, Apr. 28, 1959. To clarify and illustrate the operation of the present invention, it will be described in terms of parity errors, although it will be obvious that the principles of the present invention could be extended to other error detection or error indicating circuitry.

Assume that the parity checking of the incoming byte on lines 93, 95, 97, 99 as determined by parity check circuit 102, indicated an error. The signal on line 100, indicative of bad parity, would be applied to condition logical AND circuit 147. The second input to logical AND circuit 147 is the blink frequency signal applied on line 149, generated by frequency divider 151, which divides the end carry from Y deflection counter 73 by a factor of three. Such a frequency divider, in its simplest arrangement, could comprise three serially connected triggers, the frequency of the output of the third trigger, the blink frequency, being one-eighth that of the end carry input. In the preferred embodiment herein described, the blink frequency is on 96 milliseconds and 96 milliseconds off, although obviously any frequency within the visible spectrum could be employed.

Assuming that logical AND circuit 147 has been conditioned by a bad parity indication on line 100, the blink frequency signal applied to line 149 produces an output on line 148 from logical AND circuit 147 which is applied as one input to analog AND circuit 155. The second input to AND circuit 155 is the intensity control line 159 from the character generator 46 which is applied through intensity latch 157. If both input conditions are satisfied, the resultant signal output on line 161 provides the normal unblank intensity level to an intensity control circuit 143, basically comprising a logical AND circuit, which controls the blank/unblank condition of the CRT control grid 162 to provide, when positive, the unblank signal and when negative, the blank signal. Thus, under the condition of bad parity indication and a blink frequency indication, together with the normal intensity signal provided by the character generator, the output of intensity control circuit 143 will be unblanked and blanked in synchronism with the blink signal frequency but only the indicator associated with the error byte will be blinked. Obviously, if desired, the entire word in which the error exists could also be blinked.

Both the horizontal and vertical deflection amplifiers 53 and 73 are applied through associated D/A converters 75 and 77 to horizontal and vertical deflection drive circuits 79 and 81, the respective outputs of which drive the horizontal and vertical windings of the main deflection yoke 86. The X and Y character analog buffers 119 and 133 drive the respective horizontal and vertical deflection windings of character yoke 125.

The above described invention using a CRT indicator panel affords a substantial economy in space and circuit complexity as compared to the conventional operator's console to provide a circuit monitoring function. A particular saving is realized by displaying the hexadecimal equivalent of a byte rather than two indicators per bit utilized in conventional operator's console. Additionally, by blinking either the entire word or byte associated with the detected error, the indicator normally employed to indicate the parity of a word may be eliminated.

While the invention has been particularly shown and described with reference to a preferred embodiment thereof, it will be understood by those skilled in the art that various changes in form and details may be made therein without departing from the spirit and scope of the invention.

What is claimed is:

1. An operator's console for monitoring a plurality of circuit parameters and providing a visual indication of the status of the monitored parameters, comprising in combination:

a cathode ray tube;

means for displaying a plurality of indications indicative of the status of the monitored parameters on the cathode ray tube including intensity control means for controlling the intensity level of the cathode ray beam;

error detecting means for periodically analyzing the parameters and generating signals indicative of error conditions therein;

a source of an intermittent signal; and gating means controlled by the error detecting means for gating the intermittent signal to the intensity control means when the error detecting means detects an error within one of the monitored parameters, the intensity control means causing intermittent operation on the cathode ray tube of those indicators associated with the parameter in error.

2. Apparatus as in claim 1 wherein the means for displaying a plurality of indications indicative of the status of the monitored parameters on the cathode ray tube includes digital byte or bit indicators representative of the status of the circuit parameters being monitored.

3. Apparatus as in claim 1 wherein the error detecting means includes parity checking means.

References Cited

UNITED STATES PATENTS

| | | | |
|---|---|---|---|
| 3,346,853 | 10/1967 | Koster et al. | |
| 2,826,359 | 3/1958 | Deerhake et al. | 340—172.5 |
| 3,017,624 | 1/1962 | Deichert | 340—324 |
| 3,067,407 | 12/1962 | Schaaf | 340—172.5X |

OTHER REFERENCES

Laschenski, Computer Data Representation by Display Unit, March 1967, IBM Technical Disclosure Bulletin, vol. 9, No. 10.

JAUL J. HENON, Primary Examiner

S. CHIRLIN, Assistant Examiner